United States Patent
Schultz et al.

(10) Patent No.: US 6,345,186 B1
(45) Date of Patent: Feb. 5, 2002

(54) ARRANGEMENT, SYSTEM AND METHOD RELATING TO MOBILE COMMUNICATIONS

(75) Inventors: Johan Schultz; Peter Östrup; Nina Kopp, all of Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/458,411

(22) Filed: Dec. 10, 1999

(30) Foreign Application Priority Data

Dec. 11, 1998 (SE) .............................................. 9804293

(51) Int. Cl.[7] .............................................. H04Q 7/20
(52) U.S. Cl. ........................ 455/441; 455/436; 455/439
(58) Field of Search ................................ 455/436–444, 455/238.1, 422; 370/331

(56) References Cited

U.S. PATENT DOCUMENTS

| | | | | |
|---|---|---|---|---|
| 5,438,610 A | * | 8/1995 | Bhagat et al. | 455/422 |
| 5,937,350 A | * | 8/1999 | Frank | 455/433 |
| 5,956,644 A | * | 9/1999 | Miller et al. | 455/453 |
| 5,970,408 A | * | 10/1999 | Carlsson et al. | 455/439 |

FOREIGN PATENT DOCUMENTS

| | | | |
|---|---|---|---|
| GB | 2321161 | 7/1998 | |
| JP | 0110933 | * 5/1991 | ............ H04B/7/26 |
| WO | 97/26724 | 7/1997 | |

* cited by examiner

Primary Examiner—Vivian Chang
Assistant Examiner—Duc Nguyen
(74) Attorney, Agent, or Firm—Burns, Doane, Swecker & Mathis, L.L.P.

(57) ABSTRACT

The present invention relates to an arrangement for providing mobile stations in a mobile vehicle with radio coverage. It comprises a mobile base station which is arranged within the mobile vehicle and which serves at least one mobile cell provided in the mobile vehicle, internal antenna means arranged within the mobile vehicle for providing communication with the mobile stations in the mobile vehicle and external communication means for providing communication between the mobile vehicle and the core network. When the mobile base station and the mobile cells handled thereby are stationary within a fixed cell, at least for a given time period, the mobile base station is docked in said fixed cell such that handovers are allowed between the mobile cell served by the mobile base station and the fixed cell. The invention also relates to a method of providing mobile stations in a mobile vehicle with radio coverage and to a communication system comprising such an arrangement.

27 Claims, 5 Drawing Sheets

US 6,345,186 B1

ARRANGEMENT, SYSTEM AND METHOD RELATING TO MOBILE COMMUNICATIONS

This application claims priority under 35 U.S.C. §§ 119 and/or 365 to Application No. 9804293-0 filed in Sweden on Dec. 11, 1998; the entire contents of which is hereby incorporated by reference.

BACKGROUND

The present invention relates to an arrangement for providing mobile stations in (or outside) a cellular communication system with radio coverage when they are in a mobile vehicle. The invention also relates to a base station providing mobile stations in a mobile vehicle with radio coverage, to a cellular communication system in which radio coverage is provided for mobile stations in a mobile vehicle and to a method of providing radio communication for mobile stations in a mobile vehicle.

The user of a mobile station who is inside a mobile vehicle such as for example a train or similar will notice that the radio coverage sometimes is poor or even non-existent. This is a problem since when travelling it may be impossible to make or to receive any calls at certain parts of the track, ongoing calls may be dropped and the quality may also be varying. If, for example, a part of the track lacks radio coverage, such as for example in a tunnel, then the inside of the vehicle, e.g. the train, will experience the same lack of coverage and all ongoing calls will be dropped. It will of course also be impossible to make or receive any calls.

There are several problems associated with the provision of radio coverage to mobile stations in a mobile vehicle. Often such a mobile vehicle comprises a metal structure, inside which the mobile stations are located. The radio frequent signal, uplink (towards the base station) as well as downlink (from the base station to the mobile stations) will therefore be attenuated which has as a consequence that a mobile station will have to transmit on a higher power level than would have been necessary for example in free air. This means that the available talk/standby time will be decreased which is clearly disadvantageous. Furthermore the call will have a lower signal strength. This means that a call has a higher probability of being dropped close to the cell border. Another problem associated with mobile stations in a mobile vehicle is that all mobile stations in a specific network will be handed over to the next cell at about the same location which produces a high load on the network as such. The individual calls also run a certain risk of being dropped during a handover. Another problem is that all the cells that the mobile vehicle passes have to be dimensioned for the mobile vehicle, or rather the mobile stations that may be travelling with it, even though the cell otherwise might be sparsely populated or hardly populated at all which as such leads to a poor and unsatisfactory usage of equipment.

Numerous attempts have been done to find a satisfactory solution to these problems. Various solutions are for example based on the use of various kind of repeaters in order to enhance the radio coverage inside the train from the surrounding cell it passes through. It is common to all such known solutions that they make use of the existing cellular network and they can not make the radio environment inside the mobile vehicle any better than it is outside the mobile vehicle, and, if a part of the track lacks coverage, the situation will be the same inside the mobile vehicle.

U.S. Pat. No. 5,519,761 relates to an airborne radio telecommunication system. According to this document an aircraft can be provided with a repeater, as discussed above, but in a particular embodiment the repeater can be replaced by an airborne base station. The airborne base station has capability of registering telephones at the aircraft and the airborne base station then registers the telephone in the ground based system. Thus, once a telephone has been registered in the airborne base station, the airborne base station searches for the strongest pilot signal from a ground base station and registers with it therefore, also here the existing communications system is used, an airborne base station substantially only being used for temporary registration purposes.

SUMMARY

What is needed is therefore an arrangement that efficiently can provide a mobile station with radio coverage when the mobile station is inside a mobile vehicle, particularly a mobile vehicle comprising a metal structure, in a satisfactory manner, particularly without requiring the mobile station transmitting using a particularly high power level and with a satisfactory or high strength and carrier to interference ratio. An arrangement is also needed through which the dropping of calls due to the mobile vehicle having a poor radio coverage can be reduced or avoided. Particularly a base station is needed trough which the above mentioned objects can be achieved. Still further a cellular communication system is needed through which the above mentioned objects are fulfilled and through which the load on the network can be appropriately dimensioned without taking into consideration temporary situations such as for example a mobile vehicle passing which considerably changes the circumstances in the network as far as load etc. is concerned. Furthermore a communication system is needed through which the equipment in the system can be efficiently used and through which the load is not unduly high, i.e. for example because of a number of mobile stations having to perform a handover at substantially the same time at substantially the same place. Particularly an arrangement and a system respectively is needed through which the risk of calls being dropped due to poor radio coverage or due to handover is reduced.

A method of providing a mobile station with the radio coverage when the mobile station is within the mobile vehicle is also needed through which the above mentioned objects are accomplished.

Therefore an arrangement for providing mobile stations, of a cellular communication system, in a mobile vehicle with radio coverage, said mobile vehicle being mobile within or outside the cellular radio network which comprises a number of fixed radio base stations and a number of switching arrangements. The arrangement comprises a mobile base station arranged within the mobile vehicle which serves at least one cell provided in said mobile vehicle, internal antenna means arranged within the mobile vehicle for providing communication with the mobile stations in the mobile vehicle, external communication means for providing communication between the mobile vehicle and the core network (the fixed part of the network) and, when the mobile base station is (or intends to become) stationary within a fixed cell, at least for a given time period, it is docked with said fixed cell such that handovers are allowed between the mobile base station cell and the said stationary cell. Particularly handovers are not allowed when the mobile cells served by the mobile base station(s) are not within coverage of and stationary etc. within a fixed cell. Thus the inventive concept comprises the provision of one or more mobile cells within the mobile vehicle. Through using an appropriate internal antenna arrangement, the entire mobile vehicle will have an excellent radio environment. Such an antenna arrangement is advantageously so arranged that the distance between any mobile station within the mobile vehicle and the antenna arrangement is as short as possible leading to the requirements as to required power level are low which both results in low power consumption in the respective mobile stations and it also has as a result that only a little radio frequency energy is radiated into surrounding cells. The mobile cell(s) within the mobile vehicle will therefore not be noticed by the cells through which it travels. Particularly handovers between a mobile cell served by the mobile base station and a fixed cell are allowed when the mobile vehicle is detected or indicates that it will becomes stationary in a fixed cell in addition to when it actually is stationary within a fixed cell. Even more particularly, a neighbouring relationship is established between a mobile cell and a fixed cell when the mobile cell intends to stop in a fixed cell, according to which neighbouring relationship handovers are allowed between the mobile and the fixed cells respectively. When referring to fixed cells, cells are meant which in some way are predefined as, or characterised through, allowing docking of a mobile cell, i.e. allowing establishment of a neighbouring relationship with a mobile cell. Of course a mobile vehicle generally also moves through other cells. These, however, are supposed not to allow any docking of a mobile cell and are not interesting for the present inventive concept.

In a particular implementation of the above embodiment, a mobile cell broadcast information message is broadcast when a mobile base station or a mobile cell is stationary within a fixed cell controlled by a fixed base station indicating said fixed cell as the only neighbour to the mobile cell. Even more particularly a fixed cell broadcast information message is broadcast, when a mobile base station is stationary within a fixed cell as referred to above, indicating at least said mobile cell as neighbour to the fixed cell (generally among other conventional fixed cells).

In a particular implementation broadcast message information is sent out also when a mobile base station mobile cell(s) indicates its intention to stop in a fixed cell indicating said fixed cell and said mobile cell respectively as neighbours and allowing handovers between said cells. Particularly, when a mobile base station is outside coverage of any of the fixed cells and does not intend to become stationary within any of said fixed cells, mobile cell broadcast information and information, e.g. in the form of Condition Report Information (CRI) or similar is sent out indicating that a mobile cell has no neighbours and fixed cell broadcast information does not contain any information about the mobile cell. Information is provided to all mobile stations within the mobile cell indicating no neighbours, updated information being provided to mobile stations with ongoing calls indicating the current situation.

According to a particular embodiment handovers are only possible for the mobile base station as actually stationary within a fixed cell. In a particular embodiment a set of virtual mobile cells are indicated as permanent neighbours to a fixed cell and most particularly, when a mobile base station is stationary within a fixed cell controlled by a fixed base station, mobile cell broadcast information message is broadcast indicating said fixed cell as the only neighbour to the mobile cell, handovers being controlled by a switching arrangement, e.g. a mobile switching center handling mobile cells, preventing handovers between the fixed cell and the mobile cell unless the mobile cell actually is stationary within said fixed cell or somehow has indicated its intention to become stationary within the fixed cell.

In a particular implementation the virtual mobile cells are shown as permanent neighbours in the fixed cell broadcast information message whereas the mobile cell broadcast information message is adapted to the current situation indicating a fixed cell as a neighbour only when the mobile cell is, or intends to become stationary within the fixed cell, mobile stations within the mobile cell with ongoing calls being provided with updated information.

In a particular embodiment, implementable to any of the preceding embodiments, frequency hopping is implemented in the mobile cell to reduce interference produced by external conventional, fixed cells. As referred to earlier, the mobile cell will be not noticed by conventional fixed cells it passes through.

In an alternative implementation, in a mobile cell controlled by a mobile base station intra-cell handover to a frequency of the lower interference level is implemented to reduce interference produced by conventional, fixed cells.

In an advantageous embodiment the mobile vehicle includes means for establishing its location (in the radio network) which may take a number of different forms.

In a particularly advantageous embodiment the mobile base station comprises frequency adaption means for adapting the frequencies used in the mobile cell in relation to the frequencies used in a fixed docking cell so that the mobile cell uses a different set of frequencies.

The inventive concept is applicable to substantially all kinds of mobile vehicles such as trains, aircrafts, ferry-boats, ships or undergrounds etc.

Therefore also a base station is given which provides mobile stations in a mobile vehicle with radio coverage when the mobile vehicle moves within or even outside a cellular radio network comprising a number of fixed base stations. The base station is mobile and it includes first communication means providing radio communication with the mobile stations in the mobile vehicle and second communication means for providing communication with the core network (or the fixed part of the network, e.g. a switching arrangement) and the mobile base station serves a number of mobile cells so that when the mobile cell moves between fixed cells but outside coverage of said fixed cells and when it is within coverage of but not stationary or intending to become stationary, within any fixed cell handovers are not allowed between said mobile and said fixed cells whereas when a mobile cell is (and intending to become) stationary within a fixed cell, handovers are allowed between said fixed and mobile cells respectively.

According to particular embodiment, when a mobile base station is stationary (and possibly also when it intends to become stationary) in a fixed cell, a neighbouring relationship is established and information thereon is provided, particularly in broadcast messages. According to one particular embodiment, when the neighbouring relationship changes, e.g. when a mobile cell ceases to be stationary in a fixed cell or vice versa, the information for example provided in broadcast messages is updated both for mobile cells and for fixed cells. In an alternative embodiment information in the broadcast message is updated only for mobile cells whereas for fixed cells a set of virtual mobile cells is indicated as constant neighbours whereas a switching arrangement controlling mobile cells controls whether handovers are allowed or not.

Therefore also a cellular communication system is provided which includes a number of fixed base stations, each of which serves a number of fixed cells and a number of switching arrangements. The cellular communication system further includes a number of mobile base stations each serving a number of mobile cells provided within mobile vehicles or similar, which comprises first and second communication means for providing communication with mobile stations within said mobile vehicle or similar and the core network (or the fixed part of the network) respectively wherein when a mobile base station is within coverage of a predefined cell, and stationary or intending to become stationary within the fixed cell, the mobile base station is docked with the fixed cell such that handovers are allowed between the fixed cell and the mobile cell.

Particularly information is provided about neighbouring relationships in information messages, for example in broadcast information messages, so that when a mobile cell changes from being stationary within a fixed cell or to being stationary within a fixed cell, information thereon is provided. Particularly updated information is provided both to mobile cells and to fixed cells indicating the current neighbours. Alternatively the current situation is only reflected in information messages, particularly broadcast information messages, provided to the mobile cells whereas a set of virtual mobile cells is constantly indicated to the fixed cell irrespectively of whether the mobile cell is stationary within the fixed cell or outside coverage of the fixed cell etc., a switching arrangement controlling the mobile base station controlling the admissibility of handovers.

In other words, a set of virtual mobile cells are made permanent neighbours to the fixed cell. For the mobile cell the broadcast information message is updated to reflect the current situation. At a handover from a fixed cell to a mobile cell, the call is routed to the switching arrangement, particularly an MSC, handling the mobile cells which uses the information of the present serving cell to match the mobile cell in question. This embodiment is particularly advantageous in that a lower load is incurred upon the fixed cells and the switching arrangement (MSCs) handling them. It is also an advantage since most of the features needed are almost entirely implemented in the mobile cells and the MSC controlling them.

Therefore also a method for providing a mobile station of a cellular communication system comprising a number of fixed base stations each serving a number of fixed cells, with radio coverage when said mobile station is in a mobile vehicle is provided. The method comprises the steps of; arranging a mobile base station in association with said mobile vehicle; providing for communication between the mobile station and the mobile base station using first communication means, e.g. internal antenna means; providing for communication with the core network using second communication means; detecting whether the mobile base station is moving in relation to a fixed cell or whether it is stationary or particularly intending to become stationary within a fixed cell, providing information about neighbouring cells to mobile cells/fixed cells in information messages; allowing handovers between the fixed and the mobile cell when the mobile cell is within coverage of the fixed cell and stationary or intending to become stationary within the fixed cell.

Particularly the method includes the step of updating the information about neighbouring cells when the current situation changes for at least mobile cells. According to one embodiment the method also includes the step of providing updated information about neighbouring cells for fixed cells. Alternatively the method includes the step of permanently indicating a set of virtual mobile cells as neighbours to a fixed cell irrespectively of which is the relation between mobile/fixed cell.

BRIEF DESCRIPTION OF THE DRAWINGS

The invention will in the following be further described in non-limiting way and with reference to the accompanying drawings, in which.

DETAILED DESCRIPTION

Figure 1:
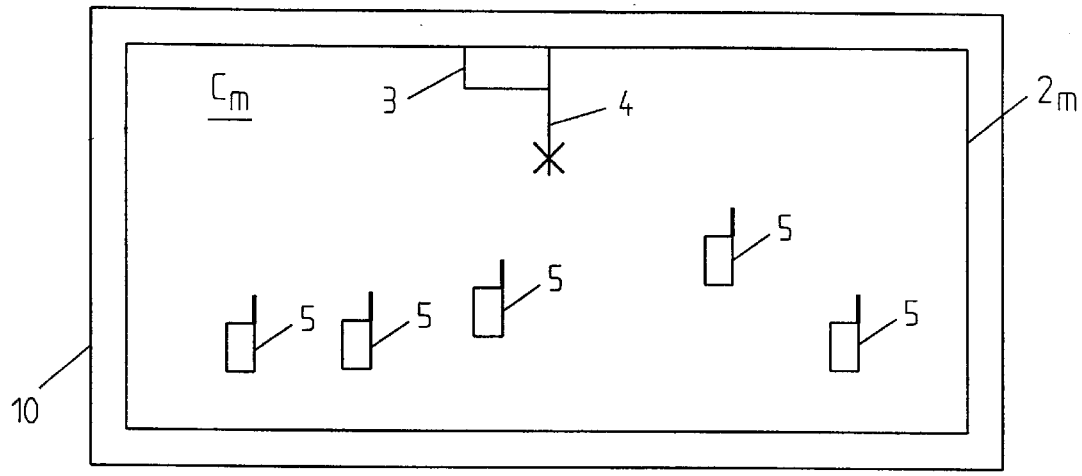
FIG. 1 shows an example on a mobile vehicle in which a base station is arranged, FIG. 2 very schematically illustrates a mobile cell assuming different states in relation to two fixed cells and with reference to which some embodiments of the present invention will be discussed.

FIG. 1 very schematically illustrates a mobile vehicle 10 which here is supposed to be for example a train. As referred to earlier, the invention is of course not restricted to be used in trains but in generally any kind of mobile vehicle. According to the invention a cell $C_m$ is provided inside the train. Inside the train also a mobile base station 3 is arranged and an antenna arrangement 4 is for example arranged at the inside of the roof of the train. The antenna arrangement 4 may for example comprise a leaking coaxial cable which is mounted at the inside of the roof. That will make the entire train have an excellent radio environment since the distance between the antenna arrangement 4 and any of the mobile stations 5 never will be more than approximately three meters (this of course depends on how the antenna arrangement is arranged, on the size of the train or of the wagon etc.). Moreover only a very low transmitting power will be needed. This will thus result in both a low power consumption in the mobile stations and it will also have as a result that only little radio frequent energy is radiated into surrounding cells (not shown). The train cell $C_m$ will therefore not be noticed by the external "conventional" cells through which it travels. The external cells may however be noticed by the train cell as interfering sources. This problem can however be solved in different ways. According to one embodiment frequency hopping is implemented. Alternatively intra-cell handover to a frequency with a lower interference level may be implemented in the mobile cell $C_m$.

Since the mobile vehicle, particularly the train, is moving in a cellular radio network, it has to be aware of where it is located within the radio network. This can also be solved in different manners. For example surrounding cells may be monitored. Alternatively the geographical location may be detected. For this purpose different means can be used, such as for example GPS (Global Positioning System) or some train specific equipment, or more generally equipment that is specific for the mobile vehicle in question.

When the mobile cell $C_m$ $2_m$ approaches a railway station, the fixed cell covering the railway station and the train cell $2_m$ are made neighbours. This means that ongoing calls can be handed over from the train cell $2_m$ to the fixed cell if the user of a mobile station 5 leaves the train and vice versa if a user of a mobile station enters the train 10. When the mobile cell $2_m$ leaves the station, the neigbouring relationship is removed or ended. The mobile cell $2_m$ will have no neighbours or no neighbouring relations when it travels between, in this case, railway stations, or rather fixed cells covering railway stations and there will be no handover attempts and the mobile cell $2_m$ is out of coverage of any fixed cell. When it intends to leave a station or when it accelerates from a railway station, this can be detected in an appropriate manner or indicated. The procedure when a mobile cell enters, and intends to stop, in a fixed cell, the mobile cell can be said to be docked with the fixed cell. Docking can e.g. be defined as the procedure when a neighbouring relationship is established; either when the mobile cell actually becomes stationary, or stops, or e.g. shortly before when it somehow indicates or it is detected, that it intends to become stationary.

The number of channels in the mobile cell $2_m$ depends on the transmission technology that is used between the train and the radio network. Different technologies exist which can be used. One example relates to spread spectrum modulation on the high voltage lines. According to another alternative a microwave link is used between the train and a leaking coaxial cable between the rails. The invention is however not limited to any particular transmission or transmission technology.

Figure 2:
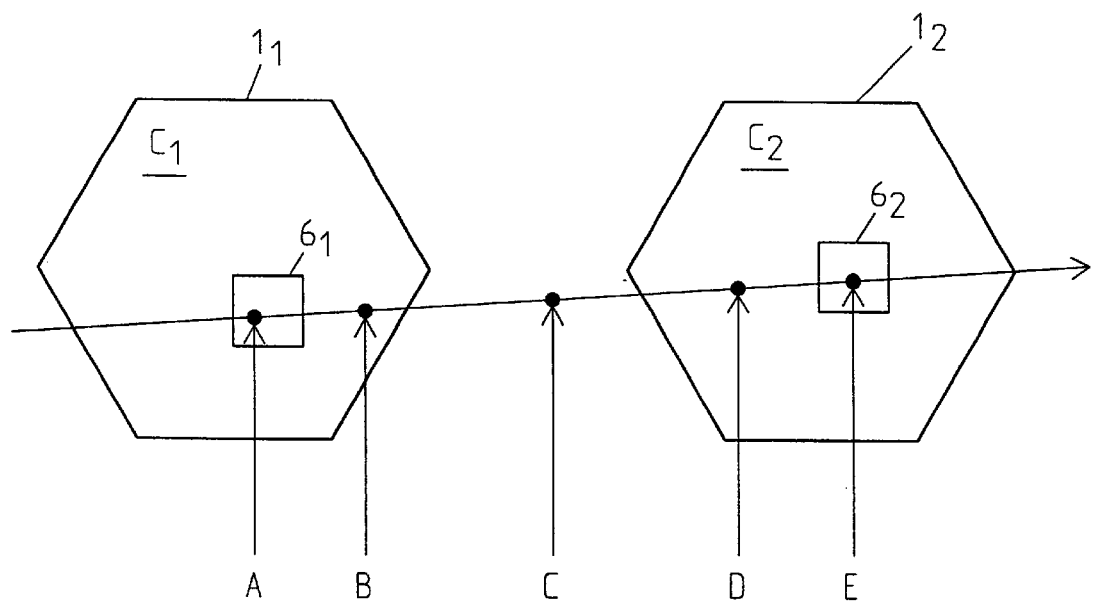

FIG. 2 schematically illustrates a first and a second fixed cell $C_1$ $1_1$, $C_2$ $1_2$ and the embodiment again relates to a train. Within the first fixed cell $1_1$ there is supposed to be a railway station $6_1$ whereas in the second fixed cell $1_2$ a second railway station $6_2$ is located. The arrows denoted A,B,C,D,E indicate different positions for a mobile cell, or a mobile base station, which however not is explicitly indicated in the figure. The train is here supposed to be moving from outside the first fixed cell $1_1$ and it is supposed to make a first stop at point A at the station $6_1$. The mobile cell is then supposed to be docked with the fixed cell $1_1$. At the stage handovers are allowed between the fixed cell and the mobile cell. Then the mobile cell, or the train, leaves the station and at point B the train (the mobile cell) is supposed to be still within coverage of cell $1_1$ but it is on its way to leave the fixed cell which is indicated in some way. Handovers between the cells are then not allowed. At the next stage the train with the mobile station, which may contain one or more mobile cells, is outside coverage of both cell $1_1$ and cell $1_2$. This is indicated through point C in the figure. No handovers are then allowed between the mobile cell and any fixed cell. At the next point, D, the mobile base station or the mobile cell is within coverage of fixed cell $1_2$ but it is still moving. However, according to this embodiment it indicates that the train with the mobile cell intends to stop at the railway station $6_2$ arranged within fixed cell $1_2$. At point D handovers are allowed between the mobile cell $2_m$ and the fixed cell $1_2$ according to a particular embodiment. Next, the train stops at the railway station $6_2$, indicated through E in the figure. Here, as at point D, the mobile cell is docked with the fixed cell $1_2$ and handovers are allowed between the fixed cell $1_2$ and the mobile cell as already explained with reference to the stop at the railway station in the first fixed call $1_1$ above. How close D is to E can be defined in different manners, e.g. based on position, distance, speed, time before reaching E etc. The same actually applies for points A and B. What is relevant is "when" a neighbouring relationship is established and that it is established under certain circumstances and when these are not fulfilled, handover is not allowed, or possible.

Figure 3A:
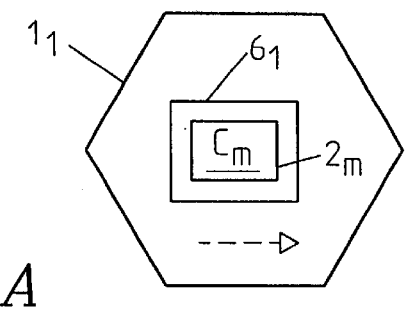
FIG. 3A shows a mobile cell which is stationary within a fixed cell.

A first embodiment according to which a train comprising a mobile cell $2_m$ travelling as illustrated in FIG. 2 will now be more thoroughly explained with reference to FIGS. 3A–3E. FIGS. 3A–3E generally illustrate the situations as indicated through points A–E in FIG. 2. In FIG. 3A the train, here illustrated through the mobile cell $2_m$, is stationary at the station $6_1$ which is given radio coverage by the first fixed cell $1_1$. The dashed arrow in the figure merely indicates the travelling direction of the mobile cell when it actually moves. In a particular embodiment the broadcast information message then shows cell $1_1$ as the only neighbour to the mobile cell $1_m$. A broadcast information message is a message that is broadcast from the network to all idle mobile stations with the cell. It specifies the cell by defining for example control channel structure, location areas and neighbouring cells. This is for example for the PDC, Personal Digital Communication, system given in RCT STD-27 Standard. Handover is then possible between the mobile cell $2_m$ and the fixed cell $1_1$. As seen from the fixed cell $1_1$ the mobile cell $2_m$ is stationary within the cell $1_1$. The broadcast information as such shows the mobile cell (and of course also other possible neighbouring cells) as a neighbour. Handovers are possible between the fixed cell and the mobile cell. Seen from the second fixed cell $1_2$ the mobile vehicle is outside coverage of the cell and the mobile cell is therefore not one of the neighbours as given in the broadcast information message. Handovers are also not possible between $C_2$ and $C_m$.

Figure 3B:
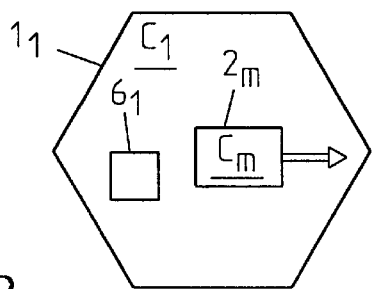
FIG. 3B shows a mobile cell which is moving within the fixed cell.

In FIG. 3B the mobile vehicle with the mobile cell $2_m$ is leaving the station $6_1$ in $C_1$. Broadcast information messages as seen from the mobile cell are changed to show that there are no neighbours. A condition report information message (or a similar message) showing that there are no neighbours is sent to all mobile stations in the mobile cell $C_m$ with ongoing calls. It is not possible to make a handover from the mobile cell. The condition report information message is also defined for example in the Standard RCR STD-27 as referred to above. It is a message that is sent from the network to mobile stations with ongoing calls. The invention is of course not limited to PDC and the standards thereof; it likewise is applicable to other systems defined through other standards. However, the message or a similar message among other things defines neighbouring cells. It is not possible to make any handover from the mobile cell. As seen from the fixed cell $C_1$, the mobile cell, or the train, is moving within the cell and $C_1$ is provided with information that the mobile cell will not be a neighbour anymore. The broadcast information message is changed to not show the mobile cell. The condition report information message showing the new set of neighbours, is sent to all mobile stations in $C_1$ with ongoing calls. Handover is not possible between $C_1$ and $C_m$. For the second fixed cell $C_2$ the situation is the same as that referred to above with reference to FIG. 3A.

Figure 3C:
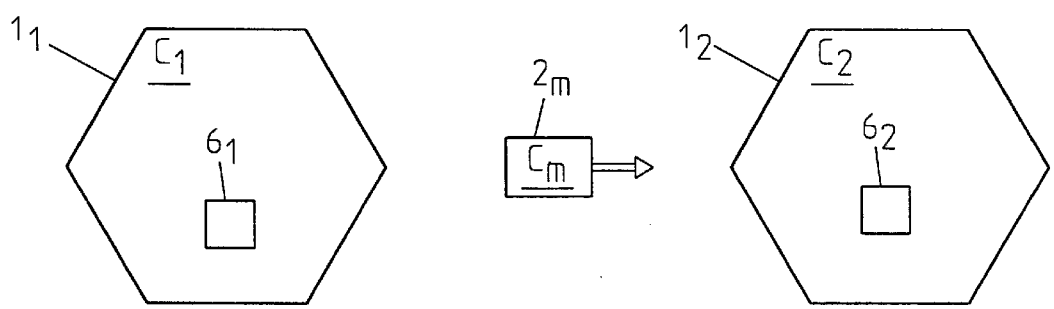
FIG. 3C shows a mobile cell which is travelling between a first fixed cell and a second fixed cell.

FIG. 3C shows a situation in which the mobile cell $C_m$ is moving between $C_1$ and $C_2$ or, in other words, the train is moving between the stations $6_1$, $6_2$. Thus the mobile cell is outside coverage of both fixed cells. The broadcast information message as far as the mobile cell is concerned, shows that there are no neighbours and handovers are not possible from the mobile cell.

As seen from the fixed cells $C_1$ and $C_2$, the mobile cell is outside the respective fixed cell and it is not among the neighbours in the broadcast information messages. Handover is not possible between fixed cells $C_1$, $C_2$ and the mobile cell respectively.

Figure 3D:
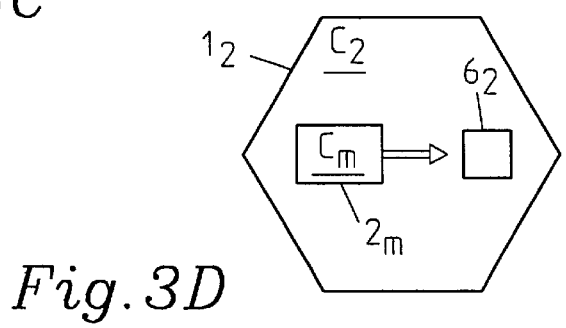
FIG. 3D shows a mobile cell which is moving within coverage of a second fixed cell in which it intends to stop.

In FIG. 3D the mobile cell approaches the station $6_2$ in the second fixed cell $C_2$. The mobile base station handling the mobile cell detects the situation, i.e. it is in some way indicated to the mobile base station. The mobile cell broadcast information message is then changed to show $C_2$ as the only neighbour and the (condition report) information message showing $C_2$ as the only neighbour is sent to all mobile stations in the mobile cell $2_m$ with ongoing calls. Handover is possible between $C_m$ and $C_2$. As seen from the second fixed cell $C_2$ the train is moving inside $C_2$ and $C_2$ therefore gets the information that the mobile cell $2_m$ will become a neighbour. The broadcast information message is changed to show the mobile cell and the (condition report) information message showing the new set of neighbours, i.e. the ordinary fixed cell neighbours and the mobile cell, is sent to all mobile stations in $C_2$ with ongoing calls. In a particular embodiment it is possible to make handover between $C_2$ and the mobile cell.

Figure 3E:
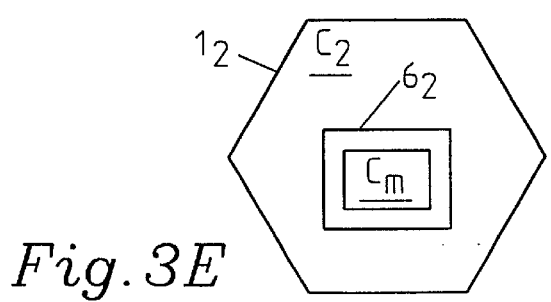
FIG. 3E shows a mobile cell which is stationary within the second fixed cell.

Finally in FIG. 3E, the train, i.e. the mobile cell $C_m$ is stationary at the station covered by $C_2$. The broadcast information message shows $C_2$ as being the only neighbour of $C_m$. Handover is possible between $C_m$ and $C_2$.

As seen from $C_2$, the train is stationary within $C_2$ and the broadcast information message shows $C_m$ as a neighbour (in addition to possible other cells). It is possible to make a handover between $C_2$ and $C_m$.

An alternative embodiment will now be described, also with reference to FIGS. 3A–3E. Bascially this embodiment is the same as seen from the mobile base station or from the mobile cell. However, instead of changing the broadcast information message in the fixed cells to reflect the current situation, a set of virtual mobile cells are made permanent neighbours to the fixed cells. When a handover is made from a fixed cell to the mobile cell, the call is routed to an MSC handling the mobile cells. Said MSC uses the information of the currently serving cell to match the mobile cell in question. In this manner the fixed cells are less loaded as well as the switching arrangements, or MSCs controlling them, which is advantageous. Furthermore the implementation of a mobile base station will be particularly simple since substantially all features that are needed are almost completely implemented in the mobile cells and a switching arrangement, particularly an MSC, handling mobile cells.

This will now be described more in detail with reference to FIGS. 3A–3E. For the situation as illustrated in FIG. 3A $C_m$ is stationary at the station $6_1$ covered by $C_1$. The broadcast information message shows $C_1$ as the only neighbour and handover is possible between $C_m$ and $C_1$. As seen from $C_1$ a set of virtual mobile cells are always shown as neighbours together with other possible cells in the broadcast information message. $C_m$ is noticed only by those mobile stations in $C_1$ which are very close to the train. A handover is possible between $C_1$ and $C_m$. As far as $C_2$ is concerned, a set of virtual mobile cells is shown as neighbours along with other possible (external or conventional) cells in the broadcast information message. For the situation in FIG. 3A the train is outside $C_2$ and can therefore not be noticed by any mobile stations in $C_2$. A handover is therefore not possible between $C_2$ and $C_m$ since the MSC handling $C_m$ would refuse it if there would be any attempt. Referring to the situation as illustrated in FIG. 3B, the train is moving away from the station in $C_1$ which is detected by the mobile base station. The broadcast information message is changed to show no neighbours in the mobile cell. The condition report information message of the mobile cell shows that there are no neighbours and it is sent to all mobile stations in the mobile cell with ongoing calls. As seen from $C_1$ the mobile cell is not noticed by (almost) any mobile stations since it is moving inside the cell and no one is allowed to be close enough for coverage. Handover is not possible between $C_1$ and $C_m$ since the MSC handling the train cell would refuse it if there would be any attempt. As far as $C_2$ is concerned, the situation remains the same as that discussed with reference to FIG. 3A.

For the situation as illustrated in FIG. 3C the train or the mobile cell is moving between the stations in $C_1$ and $C_2$. The broadcast information message indicates to the mobile cell that there are no neighbours and handover is not possible from the mobile cell. As seen from $C_1$, the train, the mobile cell, is outside $C_1$ and it can not be noticed by any mobile station in $C_1$. Handover is not possible between $C_1$ and $C_m$ since the MSC handling $C_m$ would refuse it if there would be any attempts. As far as $C_2$ is concerned, the situation is the same as that as discussed with reference to FIG. 3A.

For the situation as illustrated in FIG. 3D, the train approaches the station $6_2$ in $C_2$ which is detected by the mobile base station. The broadcast information message is changed to show $C_2$ as the only neighbour to $C_m$. The mobile base station (condition report) information message showing $C_2$ as the only neighbour is sent to all mobile stations in $C_m$ with ongoing calls and handover is possible between $C_m$, and $C_2$. As seen from $C_1$ and $C_2$, the train, or $C_m$, is outside the respective cell and can therefore not be noticed by any mobile stations in $C_1$ or $C_2$. Handover is thefore not possible between $C_1$ and $C_m$ or $C_2$ and $C_m$ since the MSC handling $C_m$ would refuse that in case there would be any attempt.

Finally, as seen from $C_m$, the situation as reflected through FIG. 3E, the train is stationary at the station $6_2$ covered by $C_2$. The broadcast information message shows $C_2$ as the only neighbour to $C_m$ and handover is possible between $C_m$ and $C_2$. As seen from $C_1$, the train is outside coverage of the cell and can therefore not be noticed by any mobile stations etc. as referred to above when discussing the situation of FIG. 3D. However, as far as $C_2$ is concerned, $C_m$ is noticed only by the mobile stations very close to the train, or $C_m$. Handover is possible between $C_2$ and $C_m$.

Figure 4:
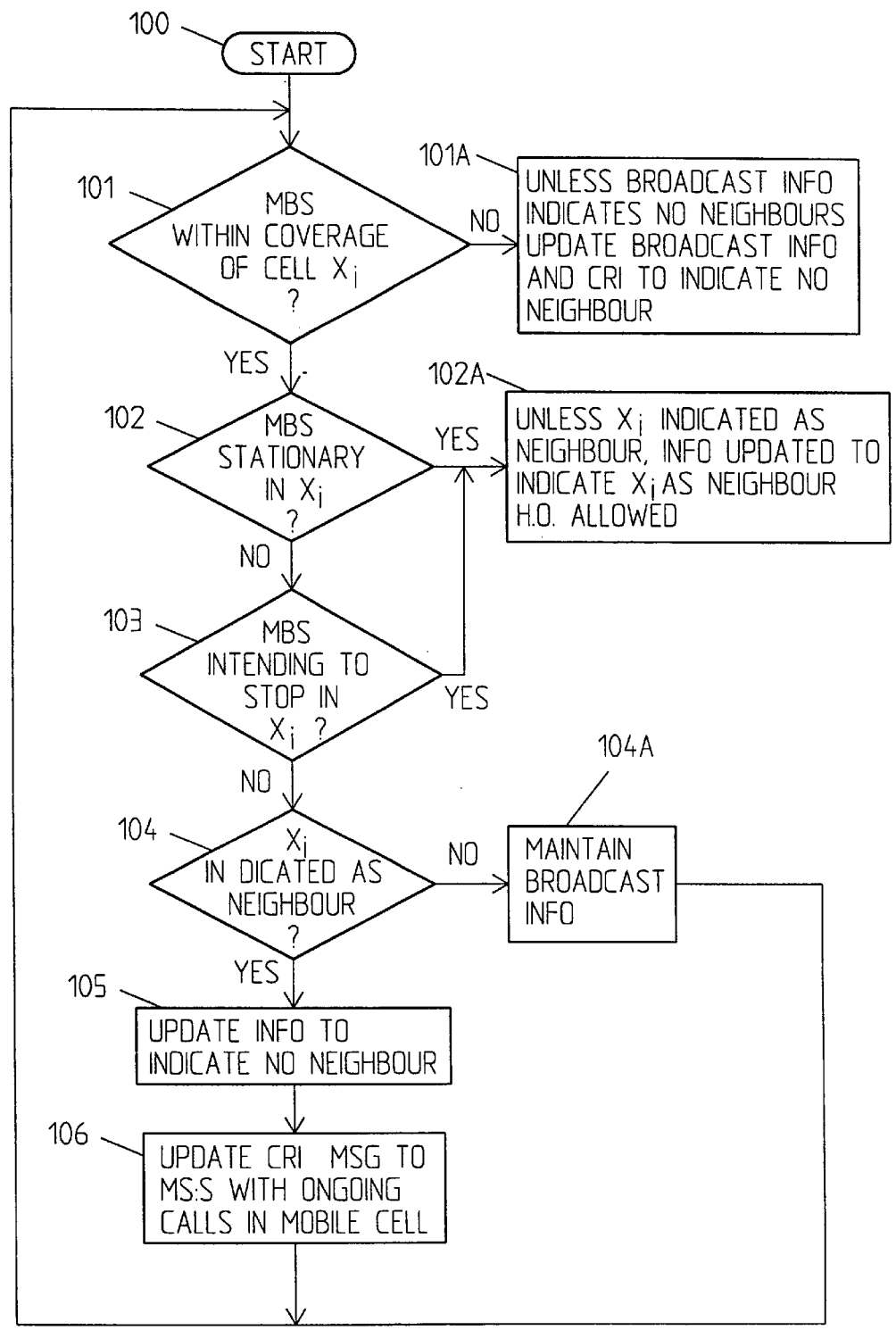
FIG. 4 is a flow diagram describing the view from a mobile cell.

FIG. 4 is a flow diagram schematically illustrating a view seen from a mobile base station MBS or from a mobile cell. From a starting position 100 is examined whether the MBS is within coverage of any fixed cells $X_i$, 101. i indicates that it is examined for different fixed cells. This can also be seen the other way around, namely that MBS detects that it is within coverage of a fixed cell. If not, unless the broadcast information indicates no neighbours, the broadcast information is updated and a CRI (Condition Report Information) message (or a similar message) is updated to indicate that there are no neighbours. If however it is detected that MBS is within coverage of a fixed cell $X_i$, it is examined whether MBS is stationary in $X_i$, 102. If yes, the information, i.e. the broadcast information and CRI are updated to indicate $X_i$ as a neighbour unless $X_i$ already is indicated as a neighbour. Handover between the mobile cell controlled by MBS and $X_i$ is allowed. If on the other hand it is detected that MBS is not stationary within $X_i$, is examined whether MBS intends to stop in $X_i$, 103. If yes, the information is updated to indicate $X_i$ as a neighbour unless this already is the case, 102A. If however it is detected that MBS does not intend to stop in $X_i$, it is examined whether $X_i$ is indicated as neighbour, 104. If not, the information is correct and no update is needed, 104A. If however $X_i$ is indicated as a neighbour, the information should be updated so as to indicate no neighbour, 105. The CRI message is then also updated and provided to mobile stations within the mobile cell with ongoing calls, 106. The information no neighbour is maintained until it is detected that MBS is within coverage of a fixed cell etc.

Figure 5:
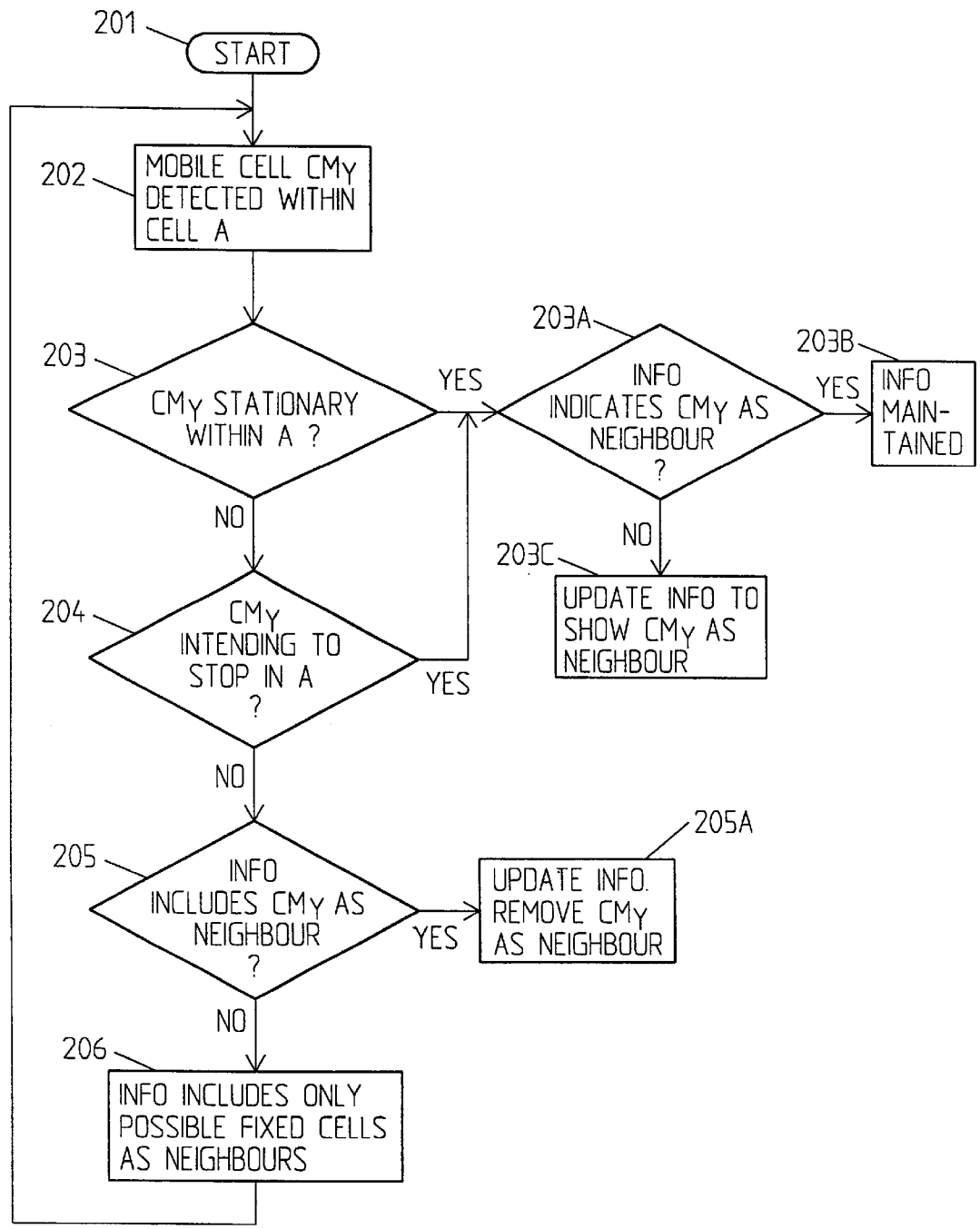
FIG. 5 is a flow diagram describing an embodiment of the view from a fixed cell.

FIG. 5 schematically illustrates the procedure as viewed from fixed cell A according to one embodiment of the invention. From the starting point, 201, it is supposed that a mobile cell $CM_y$ is detected within cell A, 201. Then it is examined whether $CM_y$ is stationary within A, 203. If yes, is checked whether the information indicates $CM_y$ as a neighbour, 203A, and if yes, the information is correct and should be maintained, 203B. If however $CM_y$ is not indicated as a neighbour, the information should be updated to include $CM_y$ as a neighbour, 203C. If on the other hand it is detected that $CM_y$ is not stationary within A, it is examined whether $CM_y$ intends to stop in A or for example at a railway station in A, 204. If yes, the information should include $CM_y$ as a neighbour, 203A–203C as discussed above. If however it also is detected that $CM_y$ does not intend to stop in A, it is examined whether the information includes $CM_y$ as a neighbour, 205. If yes, the information, should be updated in that $CM_y$ should be removed as a neighbour, 205A. If however the information does not include $CM_y$ as a neighbour, the own information only includes possible fixed cells as neighbours to cell A, 206 and the situation remains like that until a mobile cell $CM_y$ is detected within cell A etc.

Figure 6:
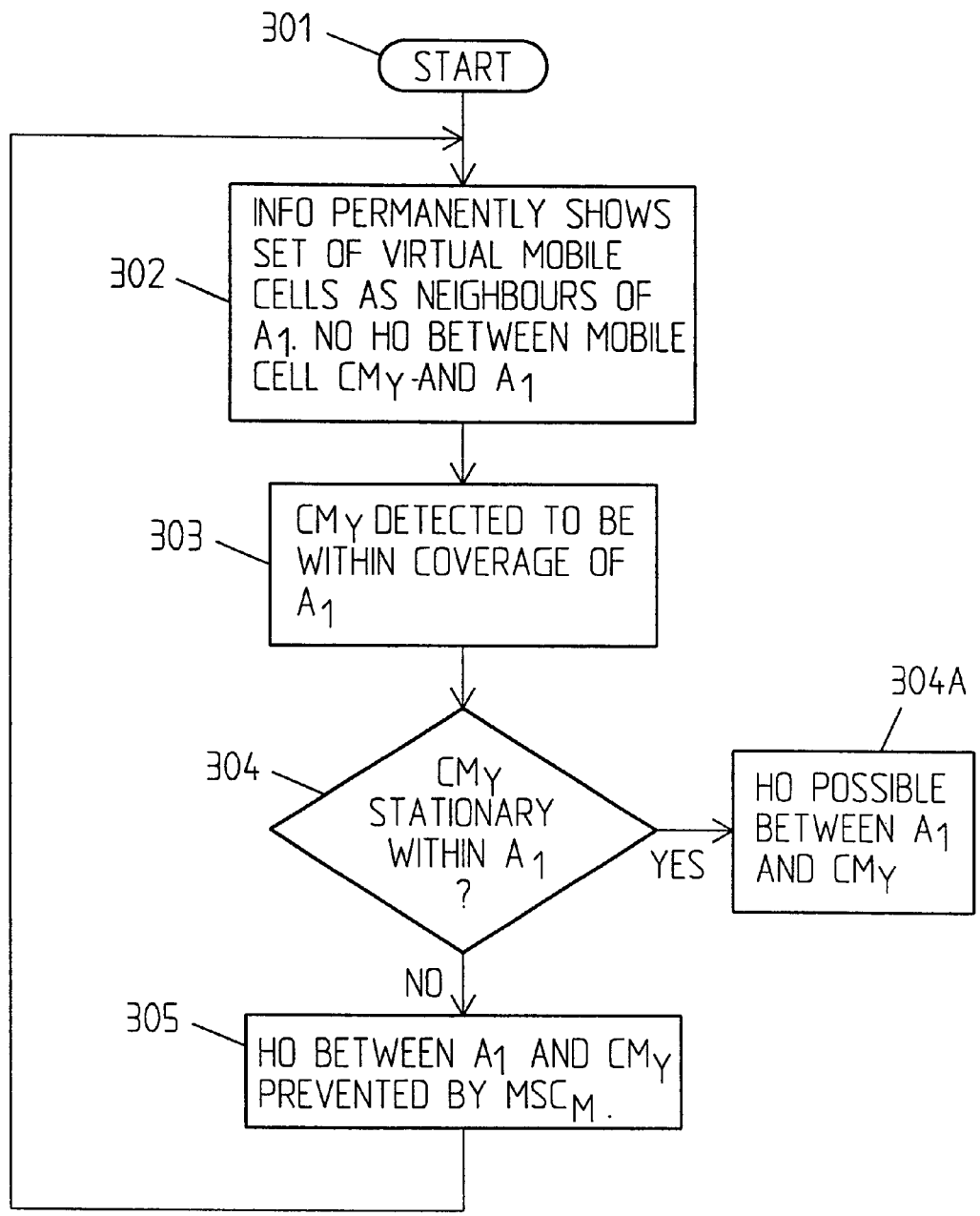
FIG. 6 is a flow diagram describing an alternative embodiment relating to the view from a fixed cell.

FIG. 6 is a flow diagram schematically illustrating an alternative embodiment. From the starting point 301, it is supposed that the information (meaning broadcast information etc.) permanently shows a set of virtual mobile cells as neighbours of a fixed cell $A_1$. No handovers are possible between the mobile cell and $A_1$, 302. Then it is supposed that a mobile cell $CM_y$ is somehow found to be within coverage of cell $A_1$, 303. Then it is established whether $CM_y$ is stationary within $A_1$, 304. If yes, handovers are possible between $A_1$ and $CM_y$, 304A. If however $CM_y$ is not stationary within $A_1$, handovers between $A_1$ and $CM_y$ are prevented by a mobile switching center $MSC_M$ controlling mobile cells. The information is then kept, permanently indicating a set of virtual mobile cells, 302 (as well as other possible fixed cells). Thus, in this case handovers are only possible when mobile cell actually is stationary within a fixed cell and the information is the same irrespectively of which is the situation, $MSC_M$ allowing handovers or not. Alternatively handovers are allowed between the mobile cell and the fixed when the mobile cell is within coverage of the fixed cell and intends to stop in it. Handover from the fixed cell to the mobile cell are particularly not possible.

According to one embodiment of the invention, which is applicable irrespectively of whether neighboring cell information is updated for both mobile and fixed cells or only for mobile cells, the frequencies which are used in the mobile cell can be adapted to the frequencies used in the fixed docking cell through the use of frequency adapting means. It can be accomplished through having the mobile base station inquiring the fixed docking cell via the radio network. When the mobile base station serving the mobile cell(s) knows which frequencies are allocated to the docking cell, it can choose a different set of frequencies and move ongoing calls using intra-cell handover to the new frequencies. An intra-cell handover is a handover from one frequency to another frequency within one and the same cell. Generally it can be performed for example because of a high degree of interference at the frequency in question. If for example the control channel needs to be moved to a new frequency, this can be performed through starting up a new control channel and publishing this control channel as a neighbour in the old control channel. Then the output power is gradually reduced in the old control channel. This will force all mobile stations in a standby state in the cell to select the new control channel believing they have choosen a new cell. Then the old control channel can be removed. Thus adaptive frequency allocation is implemented in the mobile base station when docking to a fixed cell in the static radio network.

To prevent that all or to many mobile stations actually make a handover to a fixed cell when e.g. the train stops at a station (e.g. because the signal strength of the fixed cell is much stronger etc.) appropriate cell parameter settings can be used for the mobile and/or the fixed cell, e.g. as handover parameters are concerned. However, this can be done in different ways and the invention is not limited to any particular way.

It is an advantage of the invention that through the implementation of a mobile base station as referred to above, a stable radio environment is provided which only requires very low power levels giving long talk/standby time. Furthermore, since a mobile base station does not use the surrounding cells, the user will be presented with the same radio environment irrespectively of where the mobile vehicle is, of for example a train in a tunnel or similar.

Furthermore there are numerous advantages provided for the operator of the network. The introduction of the mobile station will have as a result that there are fewer handovers in the network which means that the load is lower and there will be fewer dropped calls due to handover failure and there will also be a lower call failure rate which means that there will be a lower load and increased customer satisfaction. It will also be possible to reduce the equipment in the mobile cell to a level which is suitable for the particular cell.

Thus, according to the invention a mobile base station can be docked to specific or predefined fixed cells in static radio network allowing handover and roaming to be performed and the necessary amount of equipment in the static radio network can be reduced since the mobile base station takes the load that is generated within the mobile vehicle.

As referred to earlier in the application a mobile base station can of course be used in any kind of vehicle such as for example a ferryboat. A ferryboat might on its route not even be covered by cells and it may use a mobile base station with an established microwave link to a station ashore or even a satellite link. The inventive concept can also be implemented in a passenger aircraft with a satellite link or it can be implemented in the underground railway system in substantially the same way as for a train as described above.

Also in other aspect the invention is not limited to the illustrated embodiments, but it can be varied in a number of ways within the scope of the appended claims.

What is claimed is:

1. An arrangement for providing mobile stations in a mobile vehicle with radio coverage, which mobile vehicle is mobile within and/or outside a cellular radio network comprising a number of fixed radio base stations and a number of switching arrangements, wherein the arrangement comprises a mobile base station arranged within the mobile vehicle which serves at least one mobile cell provided in said vehicle, internal antenna means arranged within the mobile vehicle for communication with mobile stations in the mobile vehicle, external communication means being provided for providing communication between the mobile vehicle and the network, and when the mobile base station serving the mobile cell is within coverage of and stationary, or intending to become stationary, within a fixed cell, at least for a given time period, the mobile base station is docked in said fixed cell such that handovers are allowed between the mobile cells and the fixed cell.

2. An arrangement according to claim 1, wherein handovers between a mobile cell served by the mobile base station and a fixed cell is allowed when it is detected that, or indicated that, the mobile vehicle carrying a mobile base station intends to stop in the fixed cell.

3. An arrangement according to claim 2, wherein when a mobile base station is within coverage of a fixed cell and intends to stop there, a neighboring relationship is established between the mobile cell served by the mobile base station and said fixed cell according to which handovers are allowed between said mobile cells and the fixed cell.

4. An arrangement according to claim 3, wherein when a mobile base station is, or intends to become, stationary in a fixed cell, a broadcast information message is sent out indicating the fixed cell and the mobile cells served by the mobile base station as neighbors thus allowing handovers between said fixed cell and mobile cells and an information message such as e.g. a condition report information message is sent to all mobile stations in the fixed cell with ongoing calls indicating the mobile cells as a neighbor whereas information is sent to all mobile stations in the mobile cells with ongoing calls indicating the fixed cell as the only neighbor.

5. An arrangement according to claim 2, wherein a set of virtual mobile cells are indicated as permanent neighboring cells to a fixed cell, particularly in the broadcast information message.

6. An arrangement according to claim 5, wherein when a mobile base station serving a number of mobile cells is stationary within a fixed cell controlled by a fixed base station, a mobile base station broadcast information message is broadcast indicating said fixed cell as the only neighbor and in that handovers are controlled by a switching arrangement handling mobile base stations/cells, said switching arrangement preventing handovers unless the mobile base station is or intends to become stationary within a fixed cell.

7. An arrangement according to claim 5, wherein virtual mobile cells are shown as permanent neighbors in the broadcast information message of a fixed cell whereas the broadcast information message of the mobile base stations/cells adapts to the actual situation indicating a fixed cell as a neighbor when the mobile base station is stationary or intends to become stationary within the fixed cell.

8. An arrangement according to claim 1, wherein when a mobile base station serving a number of mobile cells is or will be stationary within a fixed cell controlled by a fixed base station, a mobile base station broadcast information message is broadcast indicating said fixed cell as the only neighbor.

9. An arrangement according to claim 8, wherein a fixed cell broadcast information message is broadcast indicating at least the mobile cells as neighbor(s) such that handover between the fixed cell and the mobile cells are possible.

10. An arrangement according to claim 1, when a mobile base station serving a number of mobile cells is outside coverage of any fixed cell, an information message is provided to mobile stations within the mobile cell containing the information that there are no neighbors and in that the fixed cell broadcast information message do not contain any information about the mobile cells and information is provided to all mobile stations within the fixed cell with ongoing calls containing updated information relating to neighboring cells.

11. An arrangement according to claim 1, wherein handover between a mobile and a fixed cell only is possible when the mobile base station is stationary within the fixed cell.

12. An arrangement according to claim 1, wherein the mobile cells frequency hopping is implemented to reduce interference produced by external, fixed cells.

13. An arrangement according to claim 1, wherein the mobile cells controlled by a mobile base station intra-cell handover to a frequency with a lower interference level is implemented to reduce interference produced by external, fixed cells.

14. An arrangement according to claim 1, wherein the mobile vehicle includes means for establishing its location in the network.

15. An arrangement according to claim 1, wherein the mobile base station comprises frequency adapting means for adapting the frequencies used in the mobile cells in relation to the frequencies used in a fixed docking cell in which the mobile base station is docked, so that the mobile cells uses a different set of frequencies.

16. An arrangement according to claim 1, wherein the mobile vehicle comprises a train, an aircraft, a ferry boat, a ship or an underground etc. or particularly a mobile vehicle with a metal enclosing structure.

17. A base station providing mobile stations in a mobile vehicle with radio coverage at least when said mobile vehicle is moving in a radio network comprising a number of fixed base stations and switching arrangements, wherein the base station is mobile and associated with said mobile vehicle and in that it includes first communication means providing radio communication with mobile stations in the mobile vehicle and second communication means for providing communication with the fixed part of the radio network, the mobile base station serving a number of mobile cells arranged within said mobile vehicle and in that when the mobile base station is moving between fixed cells handovers between the mobile cells and said fixed cells are not allowed, whereas when the mobile base station is stationary within a fixed cell, handovers are allowed between the mobile cells and said fixed cell.

18. A mobile base station according to claim 17 wherein when the mobile base station serving the mobile cells is stationary and when it intends to become stationary within a fixed cell, a neighboring relationship allowing handover is established between said mobile cells and said fixed cell and information thereon is provided in broadcast messages.

19. A base station according to claim 18, wherein when the state of the mobile base station in relation to a fixed cell changes, at least from moving to stationary or vice versa in relation to the fixed cell, the information in the mobile broadcast information message and the fixed broadcast information message is updated so as to correspond to the updated neighboring relationship.

20. An arrangement according to claim 18, wherein when the state of the mobile base station changes in relation to a fixed cell, the information on neighboring relationships is updated only for the mobile cells whereas for the fixed cells, a set of virtual mobile cells always is indicated as neighbors.

21. A cellular communication system including a number of fixed base stations, each serving a number of fixed cells and switching arrangements being provided for switching between base stations, comprising a number of mobile base stations each serving a number of mobile cells arranged with mobile vehicles or similar, for each mobile base station first and second communication means being provided for providing communication with mobile stations within the mobile vehicle and for providing communication with the fixed network of the cellular communication system respectively and in that when a mobile base station is not within coverage of any fixed cell able to dock a mobile cell, said mobile base station provides the mobile stations in the mobile vehicle with radio coverage, and in that when a mobile cell handled by a mobile base station is within coverage of a fixed cell and stationary, or intending to become stationary therein, handover is allowed between said mobile cell and the fixed cell.

22. A cellular communication system according to claim 21, wherein means are provided for providing information about neighboring relationships between mobile cells and fixed cells respectively.

23. A cellular communication system according to claim 22, wherein at least when the state of a mobile cell controlled by a mobile base station changes in relation to a fixed cell, the information is updated to inform about the current neighboring relationship for both fixed cells and mobile cells.

24. A cellular communication system according to claim 22, wherein when the state of a mobile cell controlled by a mobile base station is changed in relation to a fixed cell, the information is updated only for the mobile cell whereas the information for the fixed cell constantly shows a set of virtual mobile cells as neighbors.

25. A method of providing a mobile station of a cellular communication system comprising a number of fixed base stations each serving a number of fixed cells, with radio coverage when said mobile station is located in a mobile vehicle, comprising the steps of:

arranging a mobile base station and associated mobile cells in association with said mobile vehicle;

providing for a radio communication between the mobile station and the mobile base station using first communication means;

providing for communication with the fixed part of the network using second communication means;

detecting when the mobile base station is within coverage of and stationary, or intending to become stationary within a fixed cell;

providing information about neighboring cells of the mobile cells and the fixed cell in information messages; and allowing handovers between the mobile cells and a fixed cell based on the detecting.

26. The method of claim 25 further comprising the steps of:

updating the neighbor information messages for a mobile cell as soon as the mobile cell changes from stationary within to moving within a fixed cell; and updating the neighbor information message for a fixed cell as soon as a mobile cell changes from moving to stationary within, or vice versa, in relation to said fixed cell.

27. The method of claim 25 further comprising the steps of:

updating the information about neighboring cells for the mobile cell depending on the current situation; and showing a set of virtual mobile cells as neighbors to the fixed cell permanently and independently of the current state of the mobile cell, controlling handovers between a mobile cell and fixed cell via a switching arrangement controlling the mobile base station serving the mobile cells.

* * * * *